United States Patent

Green et al.

[11] Patent Number: 5,849,817
[45] Date of Patent: Dec. 15, 1998

[54] METAL PIGMENTS

[75] Inventors: William Innes Green; Jonathan Joseph Whistler Knox, both of Fife, United Kingdom

[73] Assignee: Silberline Limited, Edinburgh, Scotland

[21] Appl. No.: 966,768

[22] Filed: Nov. 7, 1997

Related U.S. Application Data

[63] Continuation of Ser. No. 720,271, Sep. 26, 1996, abandoned, which is a continuation-in-part of Ser. No. 408,823, Mar. 23, 1995, abandoned.

[30] Foreign Application Priority Data

Mar. 24, 1994 [GB] United Kingdom .................... 9405892
Nov. 11, 1994 [GB] United Kingdom .................... 9422664

[51] Int. Cl.$^6$ ...................................................... C09C 1/22
[52] U.S. Cl. .......................... 523/515; 106/403; 106/415; 106/456; 523/458; 524/401; 524/435; 524/439
[58] Field of Search .................................... 106/403, 415, 106/456; 524/401, 439, 435; 523/458, 515

[56] References Cited

U.S. PATENT DOCUMENTS

| | | | |
|---|---|---|---|
| 3,067,052 | 12/1962 | Frieser et al. ............................ | 106/404 |
| 3,773,543 | 11/1973 | Wartenberg .............................. | 427/224 |
| 3,941,584 | 3/1976 | Tundermann et al. ................... | 106/403 |
| 3,948,641 | 4/1976 | Langhammer ........................... | 75/10.39 |
| 4,328,042 | 5/1982 | Ostertag et al. ......................... | 106/403 |
| 4,420,330 | 12/1983 | JaKusch et al. ......................... | 427/127 |
| 4,865,833 | 9/1989 | Laundon et al. ......................... | 423/63 |
| 4,981,759 | 1/1991 | Nakatani et al. ........................ | 427/410 |
| 5,002,608 | 3/1991 | Fujiwara et al. ......................... | 106/437 |
| 5,003,919 | 4/1991 | Yamamoto et al. ..................... | 118/716 |
| 5,213,618 | 5/1993 | Souma et al. ........................... | 106/403 |

FOREIGN PATENT DOCUMENTS

| | | |
|---|---|---|
| 33457 | 8/1981 | European Pat. Off. . |
| 134676 | 3/1985 | European Pat. Off. . |
| 63-14805 | 10/1988 | Japan . |
| 3-277666 | 12/1991 | Japan . |
| 734774 | 8/1955 | United Kingdom . |
| 959593 | 6/1964 | United Kingdom . |
| 1245991 | 9/1971 | United Kingdom . |
| 1283081 | 7/1972 | United Kingdom . |
| 1418880 | 12/1975 | United Kingdom . |
| 1445650 | 8/1976 | United Kingdom . |
| 2001447 | 1/1979 | United Kingdom . |
| 1571850 | 7/1980 | United Kingdom . |
| 2123443 | 2/1984 | United Kingdom . |
| 1460695 | 1/1995 | United Kingdom . |

OTHER PUBLICATIONS

Derwent abstract 92–029819 of JP 03–277666, Teikoku, Dec. 1991.
JPOABS abstract of JP 03–277666, Dec. 1991.

*Primary Examiner*—Mark L. Bell
*Assistant Examiner*—Scott L. Hertzog
*Attorney, Agent, or Firm*—Quarles & Brady

[57] ABSTRACT

The present invention relates to a metal pigment, comprising a particle, preferably a flake, of iron or an alloy thereof, having on its surface a colored coating, formed by exposing the said particle to an elevated temperature in an oxygen-containing atmosphere. The product finds use in surface coatings and in the mass coloration of plastics, especially where a colored "glitter" effect is required.

1 Claim, No Drawings

METAL PIGMENTS

This is a continuation of Ser. No. 08/720,721 filed Sep. 26, 1996, now abandoned, which is a continuation in part of Ser. No. 08/408,823, filed Mar. 23, 1995, now abandoned.

The present invention relates to a metal pigment useful in surface coatings and in the mass colouration of plastics, especially where a coloured "glitter" effect is required.

It is well known to prepare coloured metallic effects from silver coloured metal pigments, such as aluminium, by admixture with organic or inorganic non-metallic pigments. When such metal pigments are below about 40 microns in diameter, the naked eye is unable to distinguish individual flakes and the pigmented article exhibits a uniform coloured metallic appearance. For example, aluminium pigments are mixed with yellow, orange or brown organic pigments to create gold effects, as an alternative to gold bronze pigments, especially in applications in which the latter tarnish easily. At larger metal pigment particle diameters, however, the eye is able to distinguish silver flakes in a coloured matrix.

There is a need for metal flake pigments whose surfaces are themselves coloured. This need has been met by the development of so-called "glitter" or "flitter" flakes, prepared by applying a pigmented coating to both sides of thin gauge metal foil and mechanically stamping, or otherwise cutting it, into flakes.

Commercially available pigments of this type, such as the products of Dragon-Werk George Wild GmbH & co., typically employ aluminium film, coated by organic pigment or dyestuff pigmented resins. Epoxy and polyester resins are known for this purpose. Many shapes are theoretically possible when the pigmented sheet is formed into flakes, but squares, rectangles and diamonds are preferred to minimise waste. The products of this "cut foil" process are offered in a wide range of colours, generally in dry powder form.

Such glitter flakes have the advantage of uniform size, but suffer from two major disadvantages. The process of cutting the pigmented, coated foil into flakes is expensive. This is particularly true when manufacturing small flakes, due to the very much larger number of cuts which must be made to produce a given weight of pigment. The second disadvantage is the tendency of the pigmented coating to separate from the metal substrate during incorporation in the application system. The delamination is caused partly by the inevitable attrition which occurs during dispersion of the flakes into the application medium, be it a coating or a thermoplastic. In certain solvent based coating systems, strong solvents may also promote this separation, by dissolving the resin component of the coating. Delamination is also caused by melting of the coating resin in mass pigmented polymers.

The delamination problem is especially serious in thermoplastics because, once delaminated, the coating becomes dispersed in the polymer, causing uncontrollable discolouration. If delamination is caused by melting rather than attrition, the discolouration is exacerbated since the pigment in the resin is released for more intimate dispersion. Delamination of larger coated flakes causes the silver colour of the underlying metal to become easily visible as pinpoints of reflected light, again altering the intended effect.

Because of the above limitations on existing products, it is not possible to reliably produce one much sought after effect in thermoplastics, that of black "glitter" in a white matrix, favoured for domestic articles such as sink utensils and waste bins. In practice, such products are produced in off-white shades of grey, blue or beige.

From the patent literature, it is apparent that there have been many attempts to prepare coloured metallic materials. Many of these involve formation of a coloured coating on the metal pigment surface by chemical reaction, or less commonly, by precipitation of a coloured species from solution. In European Patent Specification No. 33457, for example, there is claimed an aluminium flake pigment having a surface coating of iron oxide, prepared from iron pentacarbonyl in the gas phase. U.S. Pat. No. 5,213,618 discloses a titanium oxide coated chromatic colour metal flake pigment, prepared by hydrolysing an organic titanate ester compound in the presence of metal flakes, suspended in an organic medium. A similar process is described in U.S. Pat. No. 3,067,052. In this case, gold pigments are prepared by decomposition of potassium permanganate to form manganese dioxide at the metal flake surface.

Coloured metal flake pigments may also be prepared by absorption of pigments or dyestuffs onto the flake surface. Japanese Patent No. 88-148505 discloses pigments useful for colouring plastics or coatings by adsorbing pigments and unsaturated carboxylic acids onto the metal.

It is a common feature of the processes known in the art that they are often expensive to operate. To avoid aggregation and the resulting loss of opacity, reactions must be operated at high degrees of dilution. This has the effect of increasing solvent recovery costs and often means that the solvent must be recycled to contain costs. A further disadvantage is that the colour intensity of the product is often difficult to control. This is especially true of products whose colour relies on light interference. In such cases, very small changes in the thickness of the coating can cause large changes of shade.

Now, however, it has been found that the aforementioned problems of cost and coating delamination can be overcome. The invention provides a range of coloured particles, ranging from gold, through blue, to black, capable of being used in place of certain commercially available products of the cut foil type. In contrast to these cut foil products, it is found that the products of the present invention do not display any tendency to delamination of the coloured coating. In addition, the process for their formation is inexpensive and easily controlled.

Thus according to the invention, there is provided a metal pigment, comprising a particle of iron or an alloy thereof, having a coloured surface, formed by exposing the said particle to an elevated temperature, in an oxygen-containing atmosphere. The present invention also provides a pigmented thermoplastic or thermosetting polymer which comprises a said metal pigment or a corresponding pigment where the particle is not a flake.

Particles suitable for the invention are comprised of iron or a substantially iron containing alloy "e.g. containing at least 95%, especially at least 99%, iron". Suitable alloys include combinations of iron with metals such as nickel, titanium, copper, zinc, manganese, tin, cobalt, chromium and molybdenum as well as mixtures of these such as brass. Stainless steels can, in general, be used. They may be of any shape, but those which are flakes, i.e. having two approximately equal dimensions and the third considerably smaller, or which are in substantially spherical form are preferred. The particles generally have a largest dimension, or approximate diameter, in the range 5–2000 microns, generally either 5 to 700 or 1000 microns, preferably 10–300 microns, and most preferably 150–200 microns. When flake shaped particles are employed, they may be prepared by any of the techniques well known for the preparation of metal flake pigments, for example, by wet ball milling, typically in a hydrocarbon solvent such as white spirit, optionally with a lubricant such as a long chain fatty acid, typically oleic acid.

As is well known, the use of a lubricant helps to keep the particles apart and avoid cold welding. Milling techniques can provide an aspect ratio, that is, the ratio of the largest dimension of a particle to the smallest, of about 2–150:1, generally 5–75:1, for example 5–50:1 preferably 7.5–50:1 and especially 10–20:1. At the preferred aspect ratio, the flakes are sufficiently thick to retain their shape when subjected to the colour forming process and to the inevitable shear which accompanies dispersion in the application medium. Substantially spherical particles can be prepared by atomisation of molten iron or iron alloy, in an inert atmosphere. Those particularly suited to the present invention have been surface polished according to the process described in our WO 94/02551.

To form the coloured coating on the surface of the particles, it is necessary to expose the particles to an elevated temperature. Below about 150° C., the rate of colour change is found to be too slow. At very high temperatures, close to the melting point of the particle, the rate of colour change is so fast as to be uncontrollable. Moreover, sintering and disintegration of the metal, wholly as oxide, may occur. Accordingly, it is found in practice that temperatures from 200° or 250° C. to 450° C. provide the best control over the colouring process. At such temperatures, a treatment time of at least 10 seconds, for example between 10 seconds and 120 minutes, is usually appropriate. This is most conveniently accomplished in a furnace into which particles are continuously introduced and withdrawn. It is found that the colour imparted to the particles and the intensity of that colour is influenced by temperature, time and the elemental composition of the iron particle in a predicable and controllable manner. It is also advantageous to maintain the particles in motion, for example by fluidised bed techniques or by using an angled rotating furnace. This ensures the absence of hot spots, arising from the exothermic nature of the reaction, which could otherwise lead to a non-homogeneous colouration.

The effect of increasing the temperature of treatment is to cause a colour change through gold and copper tones towards blue and eventually, black. Increasing the time of treatment of the particles at a given temperature causes the shade to change in the same way.

As the iron content of the metal pigment is reduced, so the colour intensity is reduced and the time to achieve a given shade is increased. For this reason, iron pigments of high purity are preferred. They are also generally softer than iron alloys. This is important for two reasons, firstly because they are easier to form into flakes by milling and secondly because they are less liable to cause abrasion of equipment designed to disperse them in the relevant application medium.

Whilst it is believed that the action of heating the iron or iron alloy pigment is to form a coating of one or more oxides of iron, the mechanism by which the colour is generated and the nature of the chemical species involved, are not a part of the invention.

Depending on the intended application, the coated pigment may be recovered from the heating phase, cooled to ambient temperature and either retained as dry pigment, or formed into a paste or dispersion in a solvent appropriate to the application. Those pigments intended for use in plastics may usefully be converted to a low dusting granular form according to the process of our U.S. Pat. No. 4,544,600 and our EP-A-134676.

It will be appreciated that a particular advantage of the invention is that the products can be used in the high melting engineering thermoplastics not accessible to the cut foil types.

While flake can be subjected to the heat treatment it is preferred to subject iron powder to the heat treatment. Dry, atomised iron powder can be heat treated and the resulting material converted into flake in a conventional manner. The use of powder in this way has several advantages over the use of flake.

In particular, iron powder is normally supplied dry. It can, therefore, be introduced directly into the furnace. In contrast, flake normally has milling solvent adhering to it. This should desirably be removed before or during heating with the attendant fire hazard. In practice, with small flake, a controlled atmosphere is desirable, providing enough oxygen for the oxidation reaction which generates the colour but insufficient to support a fire. Clearly, by varying the oxygen content, for example, by introducing nitrogen, the rate of colouring can also be varied. This can be important in achieving shade control and reproducibility in a commercial process.

Another advantage of using iron powder is that, because of its spherical shape, it has less tendency to aggregate than flake. As the colouring reaction is exothermic, aggregation causes problems because the heat generated is not easily dissipated. This can result in uneven colouration and, in extreme cases, to some sintering giving rise to an even stronger aggregate.

Finally, after the milling step following the heat treatment, the flake is already in a solvent environment which is preferred for the process disclosed in EP-A-134676. In contrast, if flake is subjected to the heat treatment, dry, coloured flake results which then has to be mixed with solvent to rewet it before conversion to granules.

The invention is now further described by reference to the following examples. These are given by way of illustration and are in now way intended to limit the scope of the invention.

EXAMPLE 1

400 g of iron powder of 99% iron content and approximately 240 $\mu$m average particle diameter (Goodfellow Ltd), were added to a metal ball mill of dimensions 11 inches by 9 inches diameter, containing 1400 g white spirit and 20 g oleic acid lubricant and 7.5 kg of ¼ inch diameter steel grinding balls.

The mill was rotated at 80 rpm for 18 hours, after which the contents were removed by washing out with more white spirit. The recovered flake was concentrated by filtration to a metal content of 90%, then dried in an air circulating oven at 100° C. for 24 hours. There was obtained a dry, free flowing flake, silver in colour and having a median particle diameter of approximately 450 $\mu$m.

40 g of the flake thus obtained was exposed for 4 minutes in a Carbolate laboratory tube furnace, preheated to 350° C. After cooling to room temperature, the product, still in free flowing form, had assumed a homogeneous dark blue, almost black colour.

On incorporation in white pigmented polystyrene polymer by injection moulding at a 1% loading, the pigment provided a black glitter effect against a matrix whose whiteness was unchanged. In contrast, a moulding containing a similar concentration of a commercially available black cut foil glitter pigment of comparable particle size, altered the shade of the matrix from white to a pale grey.

EXAMPLES 2–6

The method of Example 1 was repeated using the same milled iron flake. The flake was exposed at 350° C. in the furnace for the times shown in Table 1. From the results, also in Table 1, it can be seen that the time of exposure to high temperature is the variable influencing the shade obtained, thus demonstrating the ease of control and robust nature of the process.

EXAMPLE 7

The heating stage described in Example 1 was repeated using a substantially spherical iron powder previously polished according to Example 1 of our WO 94/02551. There was obtained a pigment having the same deep blue colouration as that of Example 1 above.

TABLE 1

EXAMPLES 2–6: EFFECT OF TIME OF TREATMENT

| Example No. | Time of Treatment | Shade |
|---|---|---|
| 2 | 30 seconds | Silver |
| 3 | 1 minute | Gold |
| 4 | 2 minutes | Copper |
| 5 | 3 minutes | Violet |
| 6 | 4 minutes | Blue |

EXAMPLE 8

Heat Treatment of Iron Powder 100 g. lots of sub 50 mesh iron powder, supplied by Ronald Britton & Co. were each heated in air at 350° C. for 12 minutes in a Carbolite laboratory furnace, gently tumbling the material continuously to ensure an even colouration. The powder, which had assumed a deep blue colour, was removed and allowed to cool.

Preparation of Coloured Iron Flakes

To a ball mill 14 cm long and 22 cm in diameter, there were added 7.5 kg of ¼ inch diameter grinding balls, 400 g of the above treated iron powder, 700 g white spirit and 20 g oleic acid lubricant.

The mill was sealed and rotated at 100 rpm for 4.5 hours. Thereafter the metal was washed out with more white spirit and separated into various size fractions on 125, 180, 225 and 250$\mu$ screens to achieve the following distribution:

Over 250$\mu$ 18%

212–250$\mu$ 21%

180–212$\mu$ 14%

125–180$\mu$ 31%

Below 125$\mu$ 16%

Each size fraction was recovered by filtration and the filter cake independently converted to a granule by the method described in our European Patent Application 134,676, using a low melting point polyethylene wax as carrier.

APPLICATION

The granules thus formed were separately added at 1% to polyethylene polymer, precoloured white, and injection moulded to prepare demonstration pieces having a black glitter appearance with varying degrees of sparkle, corresponding to the particle size distributions to the original screen cuts.

The products of this example are particularly suited to the colouration of plastics intended to simulate granite and stoneware effects. In such applications they are generally used in combination with large flake pigments, made of, for example, aluminium or mica pearl.

We claim:

1. A pigmented thermoplastic or thermosetting polymer matrix containing a metal pigment that has been incorporated into the polymer matrix, the polymer matrix comprising a particle of at least 95% iron having a coloured surface formed by exposing the said particle to a temperature of 200° to 450° C. for a least 10 seconds up to 120 minutes in an oxygen-containing atmosphere, the polymer matrix predominating, the particle having a glittery appearance.

* * * * *

UNITED STATES PATENT AND TRADEMARK OFFICE
CERTIFICATE OF CORRECTION

PATENT NO. : 5,849,817
DATED : December 15, 1998
INVENTOR(S) : William Innes Green
Jonathan Joseph Whistler Knox It is certified that error appears in the above-identified patent and that said Letters Patent is hereby corrected as shown below:

On the title page item [30], (Foreign Application Priority Data), change the November 11, 1994 date of GB 9422664 to November 10, 1994.

Signed and Sealed this

Thirteenth Day of April, 1999

Attest:

Q. TODD DICKINSON

Attesting Officer

Acting Commissioner of Patents and Trademarks